United States Patent [19]
Uziie et al.

[11] Patent Number: 5,430,516
[45] Date of Patent: Jul. 4, 1995

[54] DRIVING APPARATUS OF CAMERA

[75] Inventors: Seiji Uziie; Kazuyoshi Azegami; Hiroshi Nomura, all of Tokyo, Japan

[73] Assignee: Asahi Kogaku Kogyo Kabushiki Kaisha, Tokyo, Japan

[21] Appl. No.: 165,928

[22] Filed: Dec. 14, 1993

[30] Foreign Application Priority Data

Dec. 14, 1992 [JP] Japan .................. 4-085645 U

[51] Int. Cl.6 ............................................. G03B 1/18
[52] U.S. Cl. ............................. 354/195.1; 359/700
[58] Field of Search ..................... 354/195.1, 195.12; 359/694, 695, 696, 697, 698, 700, 701

[56] References Cited

U.S. PATENT DOCUMENTS

| | | | |
|---|---|---|---|
| 4,974,949 | 12/1990 | Tanaka | 359/704 |
| 5,083,146 | 1/1992 | Ueda | 354/195.1 X |
| 5,144,493 | 9/1992 | Nomura | 359/700 |
| 5,270,868 | 12/1993 | Nomura | 359/700 |

Primary Examiner—Howard B. Blankenship
Attorney, Agent, or Firm—Sandler, Greenblum & Bernstein

[57] ABSTRACT

A driving apparatus of a camera includes a stationary barrel fixed to a camera body, a cam ring threadedly engaged with the stationary barrel on an inside of the stationary barrel, and a circumferential gear formed on an outer peripheral surface of the cam ring. Also provided is a gear train for transmitting driving force to the circumferential gear to rotate the cam ring, and a final gear, which is a component of the gear train and is supported on the stationary barrel to engage with the circumferential gear. A transmitting gear, which is a component of the gear train, is engaged with the final gear, wherein the shaft of the transmitting gear is supported by the camera body and by the stationary barrel.

17 Claims, 6 Drawing Sheets

DRIVING APPARATUS OF CAMERA

BACKGROUND OF THE INVENTION

1. Field of the Invention

The present invention is directed to a driving apparatus of a camera for transmitting driving force, through a gear train, to a cam ring which is threadedly engaged with a stationary barrel on the inside of the stationary barrel, wherein the stationary barrel is fixed to the camera body.

2. Description of Related Art

A zoom lens camera has been provided in which a cam ring is threadedly engaged (through helicoid gears) with a stationary barrel that is fixed to a camera body, with the cam ring being arranged on the interior of the stationary barrel. In the camera, a zooming operation is effected in a manner such that a plurality of lens groups are moved in an optical axis direction in a predetermined manner in accordance with the rotation of the cam ring. In such a camera, it is possible to provide an arrangement which associates a circumferential gear, provided on the outer peripheral surface of the cam ring, with a motor. In such an arrangement, a motor and gear train provided in the camera body are connected. A final gear of the gear train is connected to the circumferential gear. Accordingly, the cam ring can be driven by the motor through the circumferential gear.

In a camera having this type of mechanical structure for transmission of driving force, the final gear would be supported on the camera body side. Accordingly, it is unlikely that a prescribed distance between the rotational axes of the final gear and the circumferential gear will be unconditionally met upon attaching the stationary barrel to the camera body, due to limitations in the precision of the manufacturing process. In the case that an appropriate arrangement (i.e., alignment) between the final gear and the circumferential gear is not achieved, interaction between the gears would be incompliant, resulting in an undue burden on the motor and possible damage of the structure.

SUMMARY OF THE INVENTION

The primary object of the present invention is to provide a driving apparatus for use in a camera that is capable of maintaining a prescribed distance between the axes of the final gear of the gear train and the circumferential gear of the cam ring.

To achieve the object mentioned above, according to the present invention, a driving apparatus of a camera is provided having a stationary barrel which is fixed to a camera body, a cam ring which is threadedly engaged with the stationary barrel on an inside of the stationary barrel, and a gear train for transmitting driving force to the circumferential gear to rotate the cam ring. A final gear, which is a component of the gear train and is supported on the stationary barrel to engage with the circumferential gear, and a transmitting gear which is a component of the gear train and is engaged with the final gear are also provided. The shaft of the transmitting gear is supported by the camera body and the stationary barrel.

With this arrangement, a prescribed distance between the axes of the final gear of the gear train and the circumferential gear of the cam ring can be unconditionally met. Moreover, since the shaft restricting portion restricts the movement of the shaft of the transmitting gear with respect to the stationary barrel, a prescribed distance between the axes of the final gear and the transmitting gear can also be unconditionally met. Thus, the driving force transmitted from the transmitting gear can be properly transmitted to the final gear and deviation of the prescribed fixing position of the stationary barrel with respect to the camera body can be prevented. Therefore, even if the fixed position of the stationary barrel with respect to the camera body is not precise, the distance between the axes of the final gear and the circumferential gear will be consistent. Accordingly, an improper state of engagement and damage to the gears, caused by an inappropriate distance between the axes of the gears, can be prevented.

The present disclosure relates to subject matter contained in Japanese Utility Model Application No. HEI 4-85645 (filed on Dec. 14, 1992) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENTS

Figure 5:
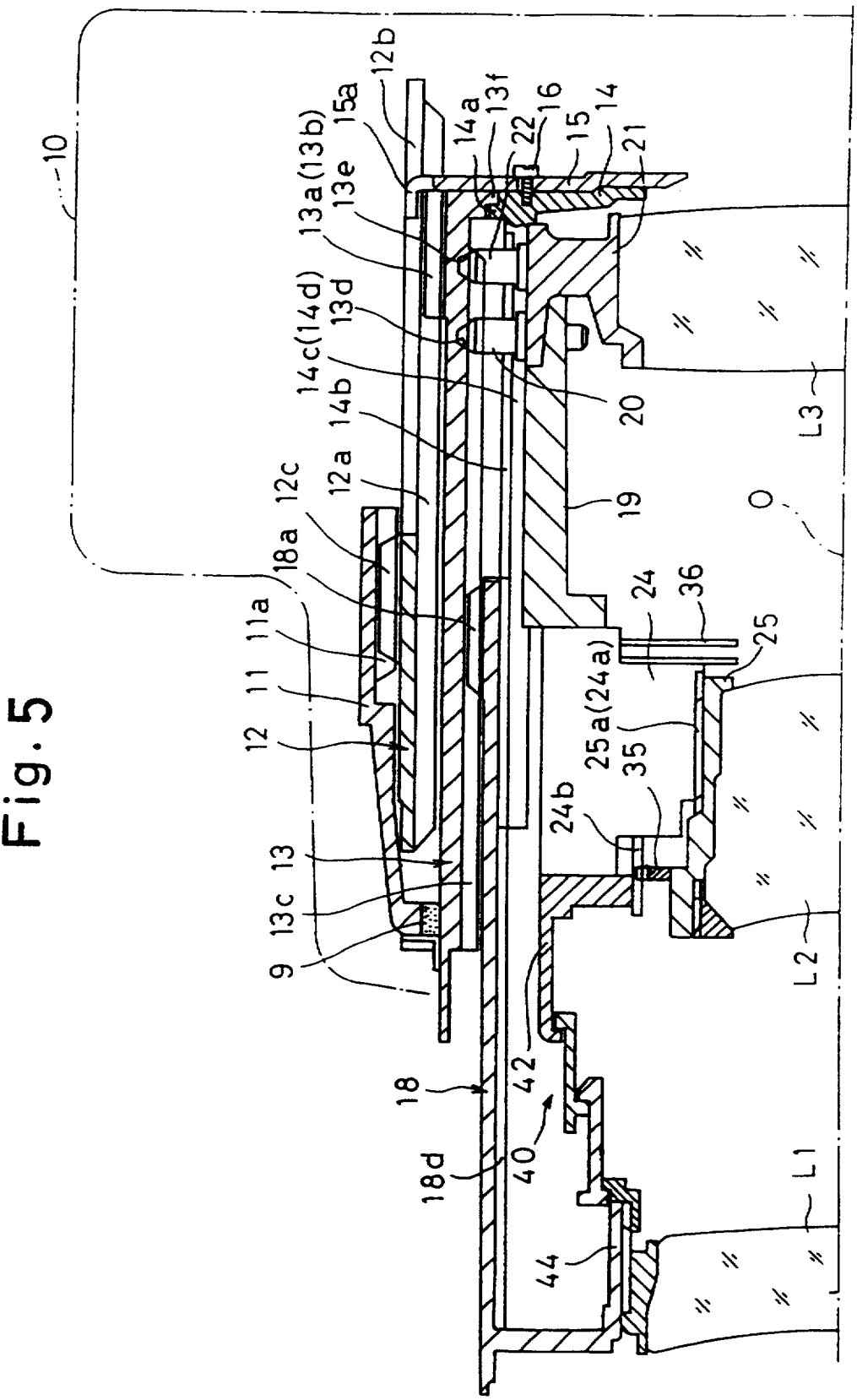
FIG. 5 is a longitudinal sectional view of an upper half of the camera, illustrating a general structure thereof; and, FIG. 6 is a longitudinal sectional view of the camera and lens, illustrating a different structural example of the final gear shown in FIG. 3.

As shown in FIG. 5, a zoom lens barrel of a camera to which the present invention is applied includes three lens groups, i.e., a first lens group L1, a second lens group L2, and a third lens group L3, which are moved in an optical axis direction O in a predetermined manner to effect a zooming operation. The second lens group L2 is moved to effect focusing.

A stationary block 50, as shown in FIGS. 1 to 4, is fixed to a camera body 10. The stationary barrel 50 is provided as a part of the camera body 10. The stationary block 50 is provided with an opening 8 to accommodate a stationary barrel 12 therein. The stationary barrel 12 is provided on its outer peripheral surface with a plurality of linear keys 52. The stationary block 50 is integrally provided with an inner wall 8a in the opening 8. The inner wall 8a is provided thereon with a plurality of linear grooves 51 with which the corresponding linear keys 52 are slidably engaged. Accordingly, the stationary barrel 12 is fitted in the opening 8 on the inner wall 8a to engage with the stationary block 50 with the plurality of linear keys 52 engaging with the corresponding linear grooves 51. The stationary barrel 12 is thereby movable in the optical axis direction O.

Rotational movement of the stationary barrel 12 is restricted with respect to the stationary block 50. The stationary barrel 12 is provided on its outer peripheral surface with a male helicoid gear 12c. An adjusting ring 11, which is provided on its inner peripheral surface with a female helicoid gear 11a, is threadedly engaged with the stationary barrel 12, i.e., the female helicoid gear 11a is engaged with the male helicoid gear 12c. The adjusting ring 11 is supported so as to be rotatable around the optical axis O, but immovable with respect to the stationary block 50 in the optical axis direction O. With this arrangement, the stationary barrel 12 is moved forwardly and rearwardly in the optical axis direction O with respect to the stationary block 50 when the adjusting ring 11 rotates in forward and rearward rotational directions, respectively. The movement of the adjusting ring 11 is restricted in the optical axis direction O with respect to the stationary block 50, i.e., the camera body 10, when a back focus adjusting operation is carried out. Therefore, the position of the stationary barrel 12 in the optical axis direction O, with respect to the camera body 10, is varied when the stationary barrel 12 moves in the optical axis direction O with respect to the adjusting ring 11. The adjusting ring 11 is provided on its inner peripheral front edge with an annular light intercepting member 9 which comes into contact with the outer peripheral surface of a cam ring 13.

The stationary barrel 12 is provided on its inner peripheral surface with a female helicoid gear 12a. The cam ring 13 is provided on its outer peripheral surface with a male helicoid gear 13a. The cam ring 13 is threadedly engaged with the stationary barrel 12 on the inside of the stationary barrel 12 with the male helicoid gear 13a engaging with the female helicoid gear 12a. The cam ring 13 is further provided with a circumferential gear 13b which inclines in a lead direction of the male helicoid gear 13a. The circumferential gear 13b is engaged with a first pinion (i.e., a final gear of a gear train G) 63 which rotates at a predetermined position. The cam ring 13 is further provided on its inner peripheral surface with a female helicoid gear 13c and inner cam grooves 13d and 13e for moving the first, second, and third lens groups L1, L2 and L3, respectively. The inner cam grooves 13d and 13e are provided in a manner such that each of them is composed of a plurality of grooves having different circumferential positions with respect to each other. The plurality of grooves are formed by cutting away predetermined portions of the female helicoid gear 13c.

A linear guiding ring 14 is provided in the cam ring 13 with the outer peripheral surface of the linear guiding ring 14 contacting the inner peripheral surface of the cam ring 13. An outer circumferential flange 14a, which is in contact with an inner circumferential flange 13f provided on the cam ring 13, is formed at the rear end of the linear guiding ring 14. A linear guiding plate 15 is fixed to the rear end of the linear guiding ring 14 by screws 16. The linear guide plate 15 is provided in a manner such that the inner circumferential flange 13f is held between the linear guide plate 15 and the outer circumferential flange 14a, and is rotatable therebetween. The linear guiding plate 15 is provided with a radial projection 15a which is engaged with a linear guiding groove 12b provided on the stationary barrel 12. Accordingly, the linear guiding ring 14 is rotatable with respect to the cam ring 13 and is movable together with the cam ring 13 in the optical axis direction O.

The female helicoid gear 13c is engaged with a male helicoid gear 18a which is formed on the outer peripheral surface of a first lens group supporting frame (i.e., lens barrel) 18. The first lens group L1 is supported by the first lens group supporting frame 18. The leads of the female helicoid gear 13c and of the male helicoid gear 18a are opposite those of the female helicoid gear 12a and male helicoid gear 13a. A cam pin 20, formed on the outer peripheral surface of a second lens group moving frame 19, is engaged with the inner cam groove 13d. A cam pin 22, which is formed on the outer peripheral surface of a third lens group supporting frame 21, to which the third lens group L3 is fixed, is engaged with the inner cam groove 13e. The cam pins 20 and 22 are engaged with linear guiding grooves 14c and 14d, respectively. Both of the linear guiding grooves 14c and 14d are formed parallel to the optical axis O and have different circumferential positions. Accordingly, the second and third lens groups L2 and L3 are linearly guided by the linear guiding ring 14.

The second lens group moving frame 19 is fixed to the rear end of an AF/AE shutter unit 24. An annular moving member 42 is fixed to the front end of the AF/AE unit 24. The AF/AE unit is provided on its inner peripheral surface with a female helicoid gear 24a. The female helicoid gear 24a is engaged with a male helicoid gear 25a formed on the outer peripheral surface of a second lens group supporting frame 25 to which a second lens group L2 is fixed. The AF/AE unit is provided with a driving pin 24b, which is moved in a circumferential direction through predetermined angles corresponding to object distance information inputted from an object distance measuring apparatus (not shown). The driving pin 24b is engaged with an interlocking arm 35 radially projecting from the second lens group supporting frame 25. Accordingly, the second lens group supporting frame 25, i.e., the second lens group L2 is moved forwardly and rearwardly in the optical axis direction O for focusing, in accordance with a rotational angle of the driving pin 24b and the leads of the helicoid gears 24a and 25a. The AF/AE shutter unit 24 also opens and closes shutter blades 36 according to object brightness information inputted from an object brightness measuring apparatus (not shown).

A linear key 18d is formed on the inner peripheral surface of the first lens group supporting frame 18. The linear key 18d is engaged with the linear guiding groove 14b. The first lens group supporting frame 18, i.e., the first lens group L1 is linearly guided with the linear key 18d engaged with the linear guiding groove 14b. A light intercepting portion 40 is provided between an annular member 44, integrally formed on the first lens group supporting frame 18, and the annular moving member 42.

Figure 1:
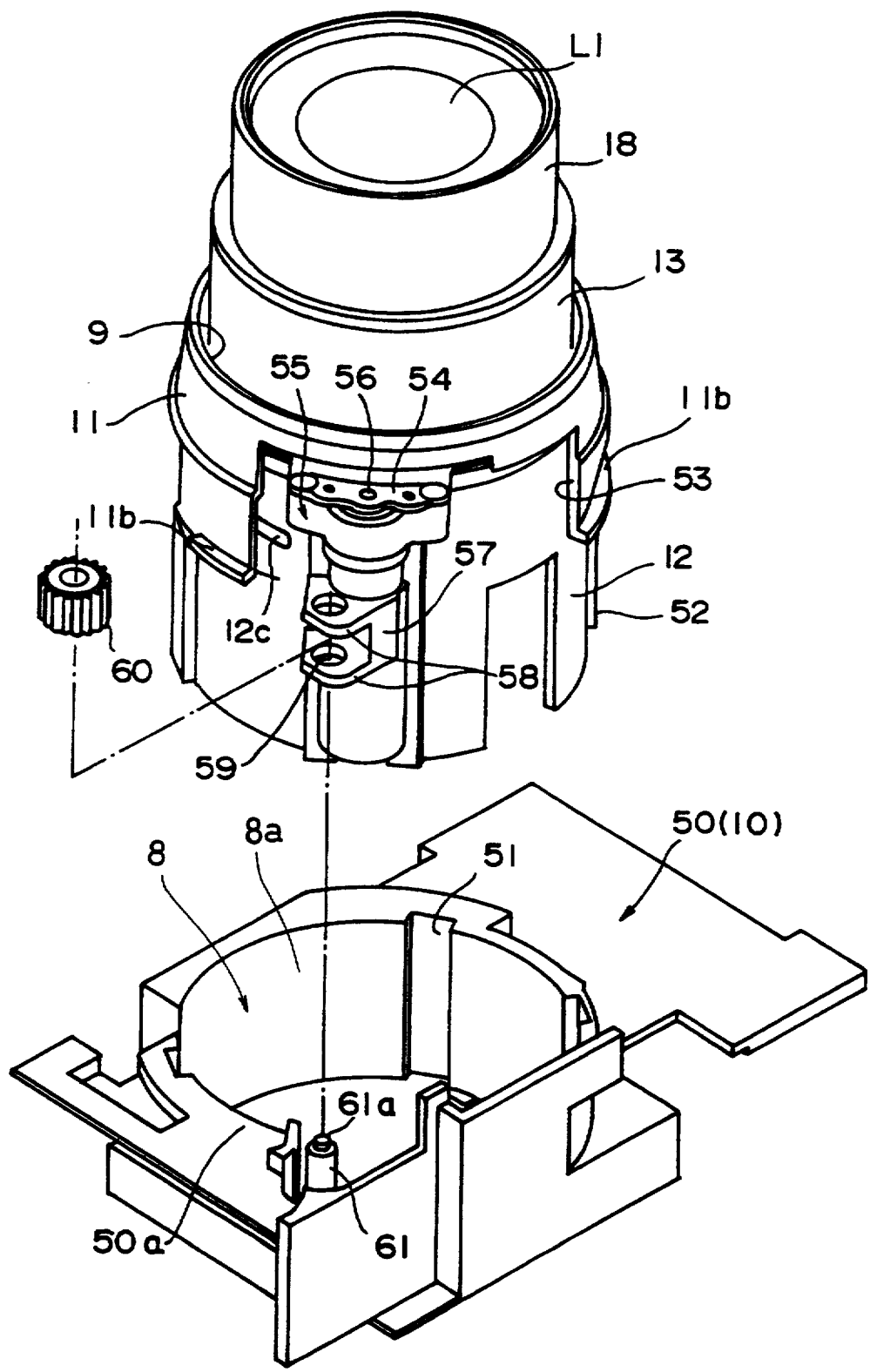
FIG. 1 is an exploded isometric view of a stationary block and a lens barrel of a camera to which the present invention is applied, illustrating the connecting structure of the stationary block and the lens barrel.
Figure 3:
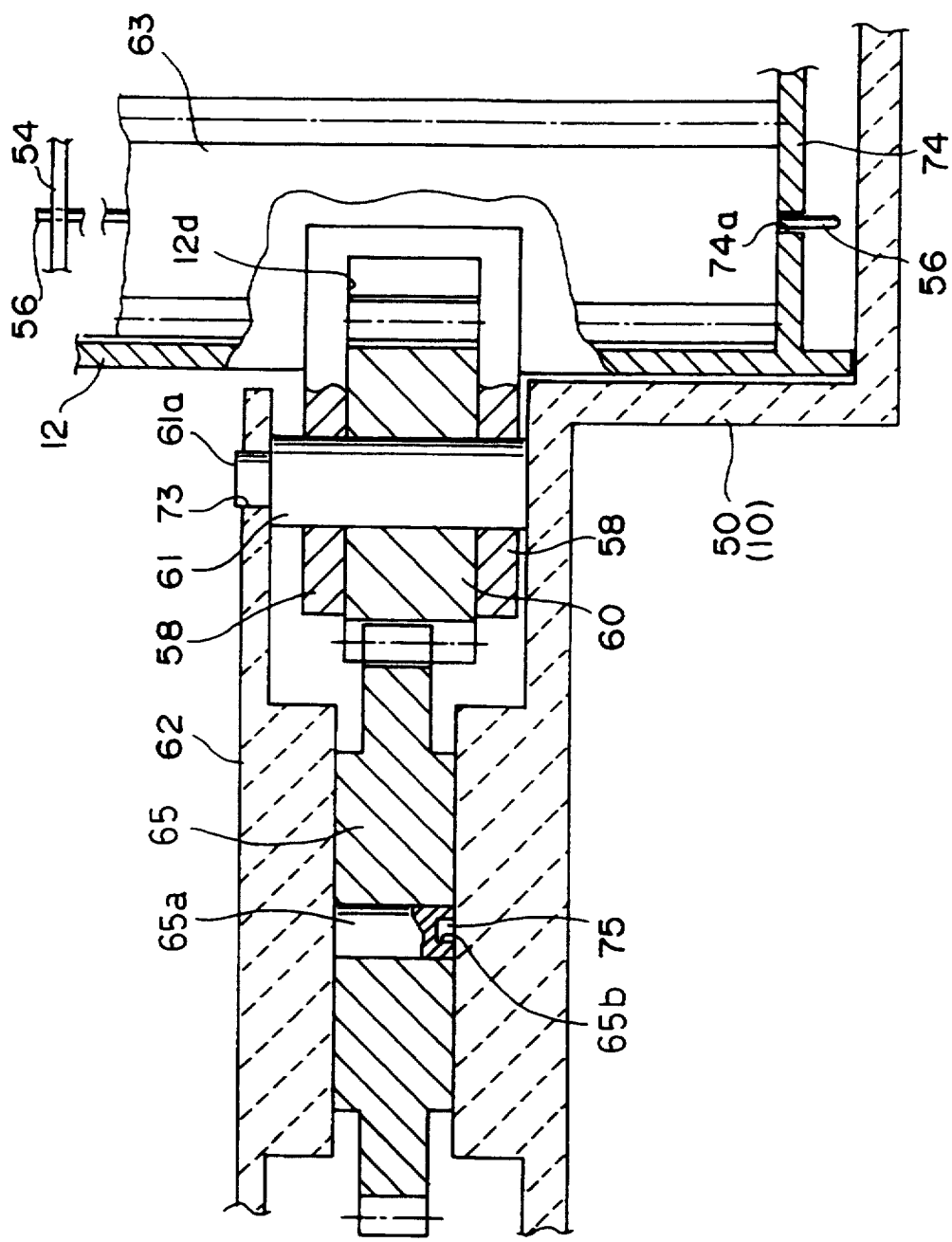
FIG. 3 is a longitudinal sectional view of the camera and lens, illustrating the connecting structure of a final gear of a gear train for transmitting driving force to a cam ring of the camera and a transmitting gear.

As shown in FIGS. 1 and 3, the stationary barrel 12 is provided with an accommodating portion 55 which is shaped to project radially outward from the outer peripheral surface of the stationary barrel 12 so as to accommodate and rotatably support the first pinion 63. The first pinion 63 is formed in a manner such that the length thereof in the optical axis direction O corresponds to the adjustable range of the circumferential gear 13b in the optical axis direction. The first pinion 63 has a shaft 56 on which the first pinion 63 is fixed. One end of the shaft 56 is rotatably supported by the accommodating portion 55 through a supporting plate 54 fixed to the accommodating portion 55. The other end of the shaft 56 is rotatably fitted in a hole 74a formed on a supporting portion 74. The supporting portion 74 is integrally formed on the inner peripheral rear end of the stationary barrel 12. Accordingly, the first pinion 63 is provided on the stationary barrel 12 in a manner such that it can engage with the circumferential gear 13b, while the movement thereof is restricted in both a radial direction and in the optical axis direction O with respect to the stationary barrel 12. Accordingly, the prescribed distance between the axes of the first pinion 63 and the circumferential gear 13b can be unconditionally met.

A supporting portion 57 is provided on the outer peripheral surface of the stationary barrel 12 to the rear of the supporting portion 55 in the optical axis direction O. The supporting portion 57 includes a pair of brackets (i.e., shaft restricting portion) 58, which are formed parallel to each other in the optical axis direction O, and holds a second pinion (i.e., transmitting gear) 60 therebetween. The second pinion 60 is a component of the gear train G and is for transmitting a driving force of motor 72 provided in the camera body 10 to the first pinion 63. The second pinion 60 rotates about a shaft 61 which is integral with the stationary block 50. The pair of brackets have a pair of supporting holes 59 in which the shaft 61 is slidably fitted. Accordingly, the second pinion 60 is held between the pair of brackets 58. The second pinion 60 is engaged with the first pinion 63 through a hole 12d which is formed in the stationary barrel 12 between the pair of brackets 58. Accordingly, the second pinion 60 is provided on the stationary barrel 12 in a manner such that the movement of the second pinion 60 is restricted in the optical axis direction O, with respect to the stationary barrel 12, by the pair of brackets 58.

The shaft 61 is parallel to the optical axis O and extends in a direction passing through the centers of supporting holes 59 and the second pinion 60 with the second pinion 60 held between the pair of brackets 58. Namely, the shaft 61 of the second pinion 60 is supported by the camera body 10 and the stationary barrel 12. Therefore, relative movement of the shaft 61 in the optical axis direction, with respect to the second pinion 60 is permitted, and movement of the stationary barrel 12 in a direction perpendicular to the optical axis O, with respect to the stationary block 50 is prevent through the pair of brackets 58. With this arrangement, a prescribed distance between the axes of the first pinion 63 and the second gear 60 can be unconditionally met, whereby the driving force transmitted from the second pinion 60 can be properly transmitted to the first pinion 63, and whereby the deviation of the prescribed fixing position of the stationary barrel to the camera body can be prevented.

Gears 65, 66, 67, 68, 69, and 70, which are components of the gear train G, and the motor 72 are independently assembled and supported on a supporting member 62 (shown in FIG. 2) which is fixed to the stationary block 50 in predetermined position. When the supporting member 62 is fixed to the stationary block 50, the gear 65, which is engaged with the second pinion 60, is rotatably supported by a rotational shaft 65a which projects from the supporting member 62 on the inner surface thereof. The rotational shaft 65a is provided with a hole 65b at an end portion thereof in which a projection 75, provided on the stationary block 50 at a predetermined position, is engaged.

A positioning hole 73 is formed in the supporting member 62 at the position corresponding to that of a reduced diameter shaft portion 61a formed at the end of the shaft 61. The reduced diameter portion 61a is engaged in the positioning hole 73. The supporting member 62, with the components of the gear train G and the motor 72 supported thereon, is fixed to the stationary block 50 by engaging the positioning hole 73 with the reduced diameter portion 61a and precisely positioning the gear 65 in engagement with the second pinion 60. Accordingly, the first and second pinions 63 and 60 are provided on the stationary barrel 12 in a manner such that their movement is restricted in both the optical axis and radial directions with respect to the stationary barrel 12. Furthermore, the gears of gear train G are provided on the stationary barrel 12 through the supporting portion 62 in a manner such that their movement is restricted in the optical axis direction O with respect to the stationary barrel 12. The motor 72 is secured to the lower surface of the supporting portion 62 by screws in a manner such that a pinion 71, which is fixed on a drive shaft (not shown) of the motor 72, is engaged with the gear 70.

Figure 2:
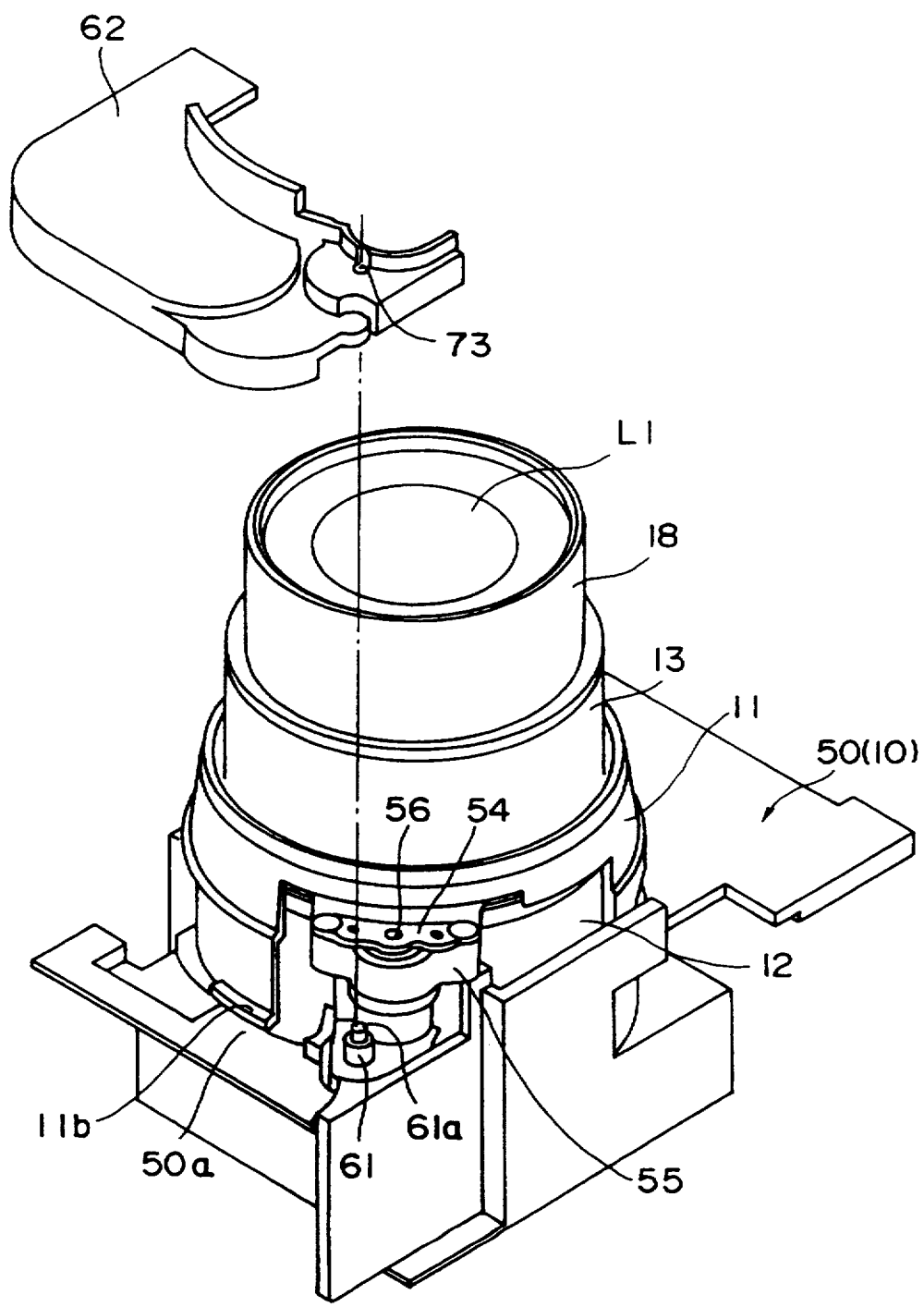
FIG. 2 is an isometric view of the stationary block and the lens barrel, illustrating a state in which the lens barrel is supported by the stationary block.

As shown in FIG. 2, the supporting member 62 is secured to the stationary block 50 by screws (not shown). A plurality of sector flanges 11b are provided on the outer peripheral rear end of the adjusting ring 11. The movement of the adjusting ring 11 is restricted in the optical axis direction O with respect to the stationary block 50. The plurality of sector flanges 11b contact the stationary block 50 by means of one or more restricting members (not shown). Hence, upon assembly, the stationary barrel 12 can be moved forwardly and rearwardly together with the second pinion 60 in the optical axis direction O with respect to the stationary block 50, i.e., the camera body 10, by rotating the adjusting ring 11. In other words, by rotating the adjusting ring 11, the cam ring 13 is moved in the optical axis direction O together with the stationary barrel 12 to vary the position of the first, second, and third lens groups L1, L2, and L3 with respect to a film plane (not shown) in the optical axis direction O, so that a back focus adjusting operation can be accomplished.

Figure 4:
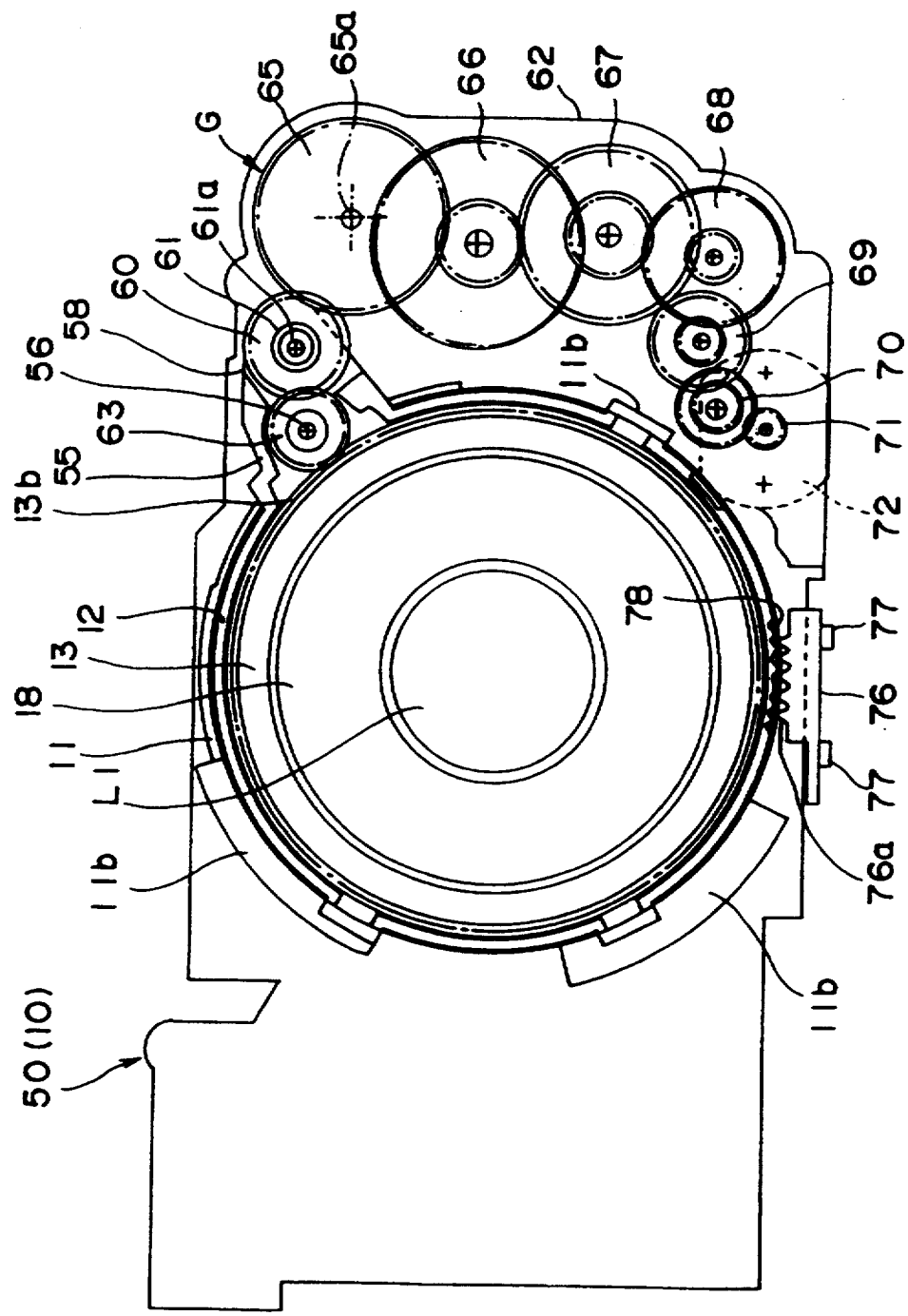
FIG. 4 is a front elevational view of the lens barrel and gear train, illustrating the assembly structure relative to the camera body.

In an assembled state, as shown in FIG. 4, the adjusting ring 11 is provided on its outer peripheral rear end at a predetermined circumferential position with a sector gear 78. A positioning plate 76 is fixed on the stationary block 50 adjacent to the sector gear 78 by screws 77. The positioning plate 76 is formed thereon with an engaging gear 76a which is engaged with the sector gear 78. The positioning plate 76 is movable in the right and left directions of FIG. 4 with respect to the stationary block 50, when screws 77 are loosened. The positioning plate 76 is fixed to the stationary block 50 by fastening the screws 77. Therefore, when the positioning plate 76 is tightly fixed to the stationary block 50, rotational movement of the adjusting ring 11 is restricted by the engaging gear 76a engaging with the sector gear 78.

The operation of the camera having the above-noted structure, to which the present invention is applied, is described below. When the first pinion 63, which is engaged with the circumferential gear 13b, is driven by the motor through the gear train G in the maximum retracted state of the zoom lens barrel, the cam ring 13 rotates and projects forwardly in the optical axis direction O, in accordance with the male helicoid gear 13a and the female helicoid gear 12a. The first lens group supporting frame 18, which is linearly guided by the linear guiding ring 14, is then further projected forwardly with respect to the cam ring 13 in accordance with the male helicoid gear 18a and the female helicoid gear 13c, whose lead directions are opposite each other. Likewise, the second lens group moving frame 19 and the third lens group supporting frame 21, which are linearly guided by the linear guiding ring 14, are projected forwardly in the optical axis direction O to effect a zooming operation in accordance with the rotation of the cam ring 13 which drives cam pins 20 and 22 through inner cam grooves 13d and 13e of the cam ring 13.

When the motor 72 is actuated, the gear 65 of the gear train G transmits the driving force of the motor 72 to the second pinion 60, while maintaining an appropriate engagement between the gear 65 and the second pinion 60, due to the reduced diameter portion 61a of the shaft 61 being engaged in the positioning hole 73 of the supporting member 62. The relationship of the gears of the gear train G and the pinion 71 of the motor 72 does not change with respect to the second pinion 63, because the gears of the gear train G, and the pinion 71 are supported by the supporting member 62 whose positioning hole 73 is engaged with the reduced diameter portion 61a.

The driving force of the motor 72 transmitted to the cam ring 13 remains stable due to the position of the first pinion 63 relative to the stationary barrel 12 being maintained constant through the supporting plate 54 and the supporting portion 74. The engagement of the first pinion 63 and the circumferential gear 13b is appropriately maintained through the supporting plate 54 and the supporting portion 74. The engagement of the second pinion 60 with the first pinion 63 is appropriately maintained by the bracket 58 and the rotational shaft 61. Accordingly, an improper state of engagement is avoided and damage to gears caused by the variation of distance between the axes of the gears can be prevented.

When a back focus adjusting operation needs to be carried out, the screws 77 are loosened. In this state, as shown in FIG. 4, the adjusting ring 11 is rotated in a predetermined direction to move the stationary barrel 12 in the optical axis direction O, in accordance with the female helicoid gear 11a and the male helicoid gear 12c which are engaged with each other. Therefore, since the cam ring 13 is moved forwardly or rearwardly in the optical axis direction O together with the stationary barrel 12, the position of the first, second and third lens groups L1, L2 and L3 in the optical axis direction O is varied to effect a back focus adjusting operation. After the adjustment is completed, the screws are fastened to restrict the movement of the adjusting ring 11 by the gear 76a engaged with the sector gear 78. In other words, after adjustment is completed, the screw 77b is fastened to restrict the movement of the adjusting ring 11 by the gear 76a engaged with the sector gear 78, so that the adjusted back focus will not vary.

Figure 6:
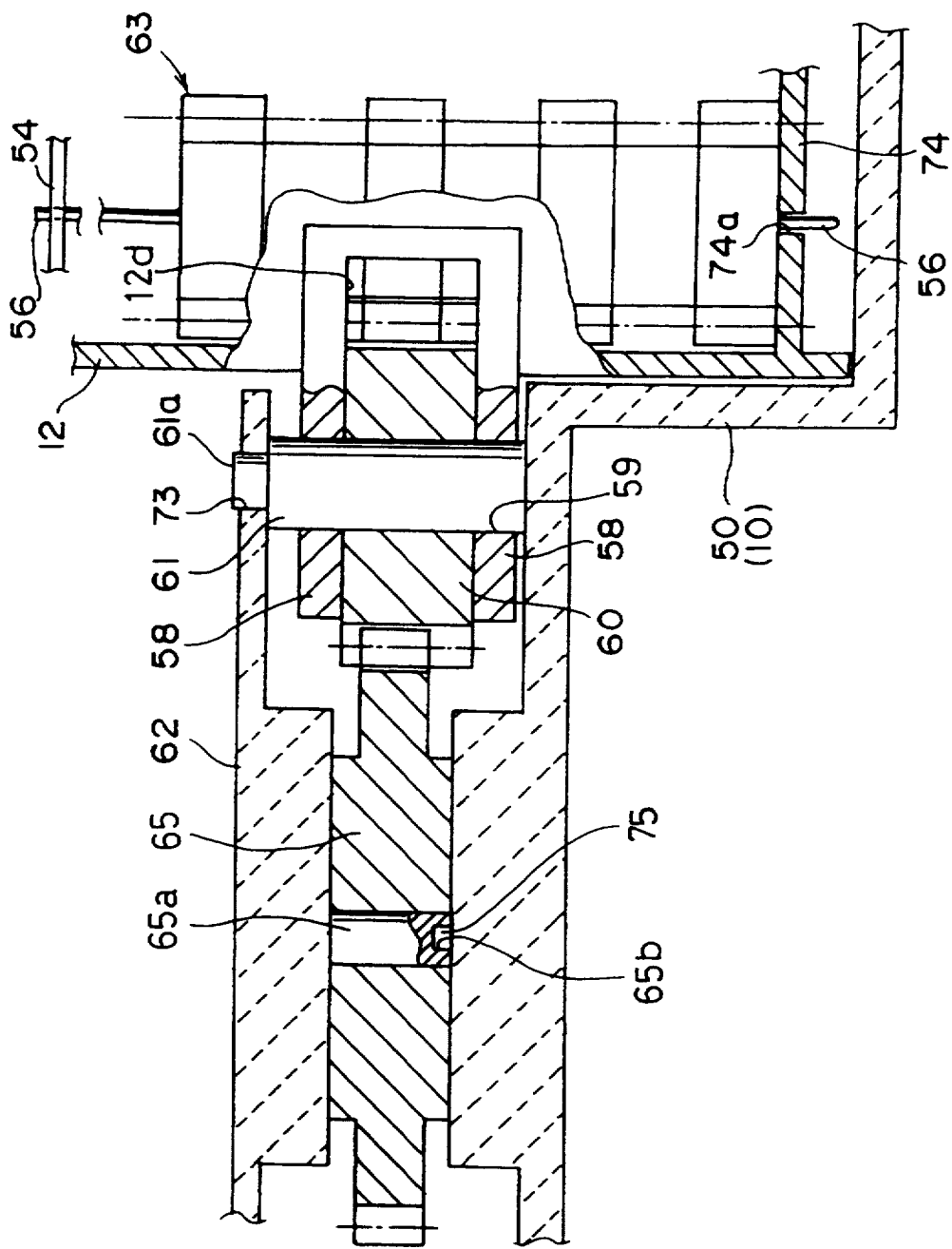

Although the first pinion 63 as the final gear of the gear train G is formed to have a length corresponding to the adjustable range of the circumferential gear 13b in the optical axis direction O as shown in FIG. 3, the first pinion may be made of a plurality of pinions which are aligned at regular intervals and have a total length which corresponds to the adjustable range of the circumferential gear 13b, as shown in FIG. 6.

In the above embodiment, although the shaft 61 is provided on the stationary block 50, i.e., the camera body 10, and the pair of brackets 58 are provided on the stationary barrel 12, the shaft 61 and the pair of brackets 58 may be provided on the stationary barrel 12 and the stationary block 50, respectively. That is, with the arrangement in which the pair of brackets 58 are provided on the camera body 10 and in which the shaft 61 is provided on the stationary barrel 12, the movement of the second pinion 60, in a radial direction of the stationary barrel 12 with respect to the stationary barrel 12, can also be restricted. The second pinion 60 may be supported in a manner such that the second pinion 60 is movable in the optical axis direction O with respect to the shaft 61.

As can be seen from the foregoing, according to the present invention, a prescribed distance between the axes of the final gear of the gear train and the circumferential gear of the cam ring can be unconditionally met and the driving force transmitted from the transmitting gear can be properly transmitted to the final gear due to the arrangement in which; (1) the final gear which is engaged with the circumferential gear of the cam ring is supported on the stationary barrel, (2) the shaft of the transmitting gear which is engaged with the final gear and transmits driving force to the final gear, is provided on the camera body and stationary barrel, and (3) the shaft of the transmitting gear is supported by the camera body and the stationary barrel. Therefore, even if the fixed position of the stationary barrel with respect to the camera body is not precise, the distance between the axes of the final gear and the circumferential gear will be consistent. Accordingly, an improper state of engagement and damage to the gears caused by the inappropriate distance between the axes of the gears can be prevented.

Although the invention has been described with reference to particular means, materials and embodiments, it is to be understood that the invention is not limited to the particulars disclosed and extends to all equivalents within the scope of the claims.

We claim:

1. A driving apparatus of a camera, comprising:
   a stationary barrel which is fixed to a camera body;
   a cam ring which is threadedly engaged with said stationary barrel on an inside of said stationary barrel;
   a circumferential gear which is formed on an outer peripheral surface of said cam ring;
   a gear train for transmitting driving force to said circumferential gear to rotate said cam ring;
   a final gear which is a component of said gear train, said final gear being supported on said stationary barrel and engaged with said circumferential gear; and,
   a transmitting gear which is supported on a shaft and is a component of said gear train, said transmitting gear being engaged with said final gear for rotating said final gear;
   wherein an end portion of said shaft of said transmitting gear is supported by said camera body and another portion of said shaft is supported by said stationary barrel, said shaft, supported by said camera body and by said stationary barrel, comprising means for positioning said stationary barrel with respect to said camera body.

2. The driving apparatus of claim 1, wherein movement of said final gear with respect to said stationary barrel is restricted in a radial direction of said stationary barrel.

3. The driving apparatus of claim 1, wherein said gear train further includes a plurality of gears other than said final gear and said transmitting gear.

4. The driving apparatus of claim 3, further comprising:
a supporting member which supports said plurality of gears, wherein movement of said plurality of gears with respect to said stationary barrel is restricted in the radial direction of said stationary barrel through said supporting member.

5. The driving apparatus of claim 1, further comprising:
a stationary block which is provided as a part of said camera body, said stationary block including said shaft, wherein said shaft is fixed to said stationary block at said end portion with said shaft orientated parallel to an optical axis.

6. The driving apparatus of claim 1, wherein a shaft restricting portion is integral with said stationary barrel and is composed of a pair of brackets having a pair of supporting holes in which said shaft passes through, said pair of supporting holes restricting movement of said shaft in a direction perpendicular to an optical axis direction with respect to said stationary barrel.

7. The driving apparatus of claim 6, further comprising:
a motor for generating the driving force which is to be transmitted to said circumferential gear through said gear train, and a supporting member for supporting a plurality of gears of said gear train and a motor.

8. The driving apparatus of claim 7, wherein said supporting member is fixed to a predetermined position on said camera body at least in accordance with said shaft of said transmitting gear, and wherein said plurality of gears, which is to be engaged with said transmitting gear, is properly engaged with said transmitting gear.

9. The driving apparatus of claim 1, wherein said cam ring is further provided on an outer peripheral rear end thereof with a male helicoid gear, and wherein said circumferential gear is formed in a manner such that said circumferential gear is inclined in a lead direction of said male helicoid gear.

10. The driving apparatus of claim 9, wherein said final gear is formed in a manner such that a length of said final gear corresponds to an adjustable range of said circumferential gear in said optical axis direction of said camera.

11. A driving apparatus of a camera, comprising:
a stationary barrel which is fixed to a camera body;
a cam ring which is threadedly engaged with said stationary barrel on an inside of said stationary barrel;
a circumferential gear which is formed on an outer peripheral surface of said cam ring for transmitting a driving force of a drive source to said cam ring; and,
a gear train for transmitting the driving force to said circumferential gear,
wherein at least one gear which is a component of said gear train is supported for rotation on a shaft, said shaft having an end portion supported by said camera body, another portion of said shaft supported by said stationary barrel, whereby said shaft and said gear are supported by both said camera body and said stationary barrel, said shaft, supported by said camera body and by said stationary barrel comprising means for positioning said stationary barrel with respect to said camera body.

12. The driving apparatus of a camera according to claim 1, said transmitting gear and said shaft comprising means for transmitting driving force to said circumferential gear, said transmitting gear and shaft further comprising means for positioning said stationary barrel with respect to said camera body.

13. The driving apparatus of a camera according to claim 11, said at least one gear and said shaft comprising means for transmitting driving force to said circumferential gear, said at least one gear and said shaft further comprising means for positioning said stationary barrel with respect to said camera body.

14. A driving apparatus of a camera, comprising:
a stationary barrel which is fixed to a camera body;
a cam ring which is threadedly engaged with said stationary barrel on an inside of said stationary barrel;
a circumferential gear which is formed on an outer peripheral surface of said cam ring;
a gear train for transmitting driving force to said circumferential gear to rotate said cam ring;
a final gear which is a component of said gear train, said final gear being supported on said stationary barrel and engaged with said circumferential gear; and,
a transmitting gear which is supported on a shaft and is a component of said gear train, said transmitting gear being engaged with said final gear for rotating said final gear;
wherein an end portion of said shaft of said transmitting gear is supported by said camera body and another portion of said shaft is supported by said stationary barrel, said end portion of said shaft being directly supported on said camera body, said another portion of said shaft being directly supported on said stationary barrel.

15. A driving apparatus of a camera, comprising:
a stationary barrel which is fixed to a camera body;
a cam ring which is threadedly engaged with said stationary barrel on an inside of said stationary barrel;
a circumferential gear which is formed on an outer peripheral surface of said cam ring for transmitting a driving force of a drive source to said cam ring; and,
a gear train for transmitting the driving force to said circumferential gear,
wherein at least one gear which is a component of said gear train is supported for rotation on a shaft, said shaft having an end portion supported by said camera body, another portion of said shaft supported by said stationary barrel, whereby said shaft and said gear are supported by both said camera body and said stationary barrel, said end portion of said shaft being directly mounted on said camera body, said other portion of said shaft being directly mounted on said stationary barrel.

16. The driving apparatus according to claim 14, further comprising means for restricting movement of said final gear with respect to said stationary barrel in a radial direction of said stationary barrel.

17. The driving apparatus of a camera according to claim 14, further comprising a male helicoid gear provided on an outer peripheral rear end of said cam ring, said circumferential gear being inclined in a lead direction of said male helicoid gear.

* * * * *